US008561842B2

(12) United States Patent
Pizzacalla et al.

(10) Patent No.: US 8,561,842 B2
(45) Date of Patent: Oct. 22, 2013

(54) VALVE APPARATUS FOR SELECTIVELY DISPENSING LIQUID FROM A PLURALITY OF SOURCES

(75) Inventors: Anthony Domenic Pizzacalla, Freeport (BS); Domenico Leone, Burnaby (CA)

(73) Assignee: Keg Switch Technologies, LLC, Freeport (BS)

( * ) Notice: Subject to any disclaimer, the term of this patent is extended or adjusted under 35 U.S.C. 154(b) by 56 days.

(21) Appl. No.: 13/319,369

(22) PCT Filed: May 13, 2009

(86) PCT No.: PCT/CA2009/000605
§ 371 (c)(1),
(2), (4) Date: Nov. 8, 2011

(87) PCT Pub. No.: WO2010/130021
PCT Pub. Date: Nov. 18, 2010

(65) Prior Publication Data
US 2012/0048888 A1     Mar. 1, 2012

(51) Int. Cl.
*B67D 1/00*     (2006.01)
*B67D 7/14*     (2010.01)
*F16K 31/18*    (2006.01)
*F16K 17/42*    (2006.01)
*F16K 21/18*    (2006.01)

(52) U.S. Cl.
USPC ............... 222/66; 222/67; 137/409; 137/429; 137/397

(58) Field of Classification Search
USPC .......... 222/64–68, 130, 132, 386.5, 394, 399; 137/255, 256, 266, 396–398, 409, 429, 137/430, 433, 602, 605, 607
See application file for complete search history.

(56) References Cited

U.S. PATENT DOCUMENTS

| | | | | |
|---|---|---|---|---|
| 2,612,304 A | * | 9/1952 | Nissen | 99/323.2 |
| 2,855,944 A | * | 10/1958 | Albin | 137/102 |
| 3,015,420 A | * | 1/1962 | Chudnow | 222/144.5 |
| 3,200,991 A | * | 8/1965 | Mills | 222/61 |
| 3,587,927 A | * | 6/1971 | Stott | 222/66 |
| 3,878,970 A | | 4/1975 | Nezworski | |

(Continued)

FOREIGN PATENT DOCUMENTS

AU     B-68867/81 P     2/1981
AU     B6886781 P       2/1981

(Continued)

*Primary Examiner* — Paul R Durand
*Assistant Examiner* — Vishal Pancholi
(74) *Attorney, Agent, or Firm* — Priya Sinha Cloutier; Lane Powell, PC

(57) ABSTRACT

A valve apparatus includes a valve body having a first inlet, a second inlet, an outlet, and a passageway in communication with the inlets and outlet. A valve member disposed within the passageway inhibits communication between the first inlet and the second inlet and, in a first position, the second inlet and the outlet. The valve body includes a float chamber communicating with the first inlet and the outlet. A float member disposed within the float chamber is buoyant and is operatively engageable with the valve member. The float member is displaceable upwards by liquid in the chamber to enable communication between the first inlet and the outlet. When liquid from the first inlet is depleted, the float member lowers to seal the first inlet from the outlet. The valve member moves to a second position thereby to enable the second inlet to be in communication with the outlet for dispensing liquid from the second source.

21 Claims, 7 Drawing Sheets

(56) References Cited

U.S. PATENT DOCUMENTS

| | | | |
|---|---|---|---|
| 3,930,598 A * | 1/1976 | Slagle | 222/129.4 |
| 4,262,879 A * | 4/1981 | Gonner | 251/230 |
| 4,438,782 A * | 3/1984 | Kelly | 137/628 |
| 4,947,739 A * | 8/1990 | Owen | 99/323.2 |
| 5,320,252 A * | 6/1994 | Fleming | 222/145.1 |
| 5,620,021 A | 4/1997 | Hugo | |
| 6,062,427 A * | 5/2000 | Du | 222/67 |
| 6,745,592 B1 | 6/2004 | Edrington et al. | |
| 7,303,096 B2 * | 12/2007 | Speight | 222/64 |
| 7,412,988 B1 * | 8/2008 | Alexander | 137/446 |
| 2005/0072800 A1 | 4/2005 | Smith | |

FOREIGN PATENT DOCUMENTS

| | | | |
|---|---|---|---|
| GB | 2133508 A | | 7/1984 |
| GB | 2135693 A | * | 9/1984 |
| GB | EP0235477 A1 | | 9/1987 |
| GB | EPO235477 A1 | | 9/1987 |
| GB | 2210680 A | * | 6/1989 |
| GB | EP0353104 A1 | | 1/1990 |
| GB | EPO353104 A1 | | 1/1990 |
| GB | EPO598621 A1 | | 5/1994 |
| GB | 2270301 A | | 9/1994 |
| GB | 2279330 A | | 1/1995 |

* cited by examiner

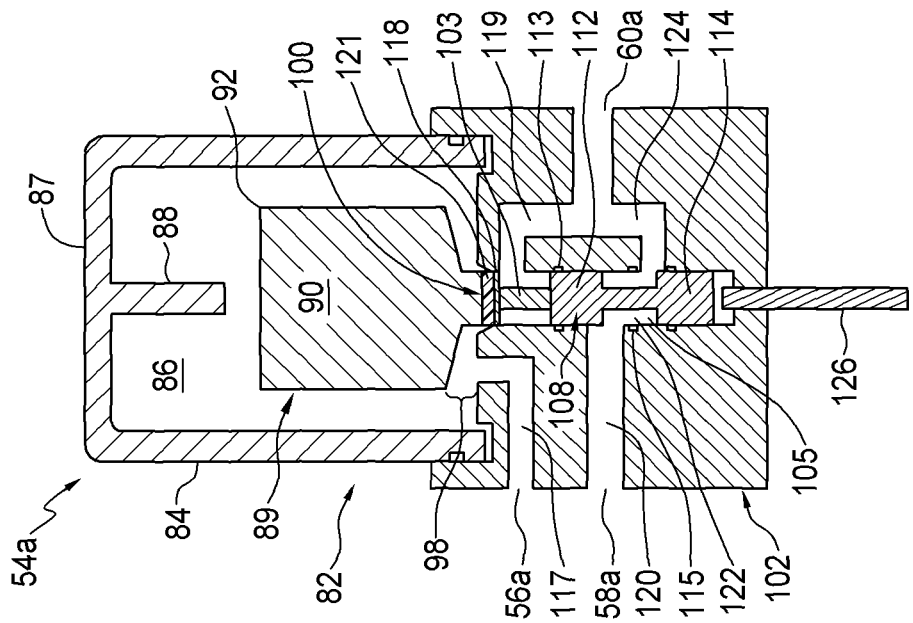

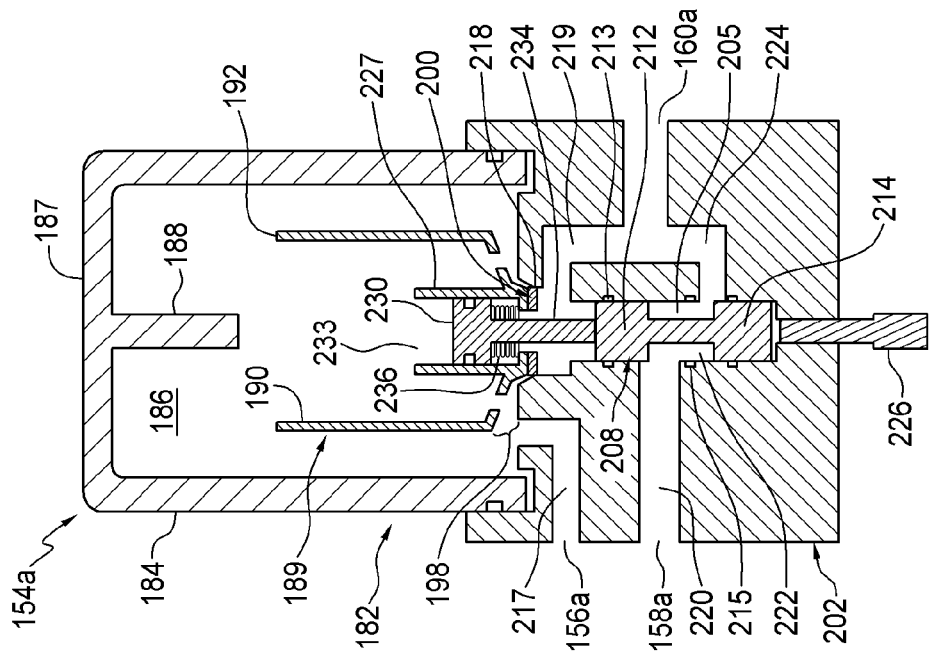
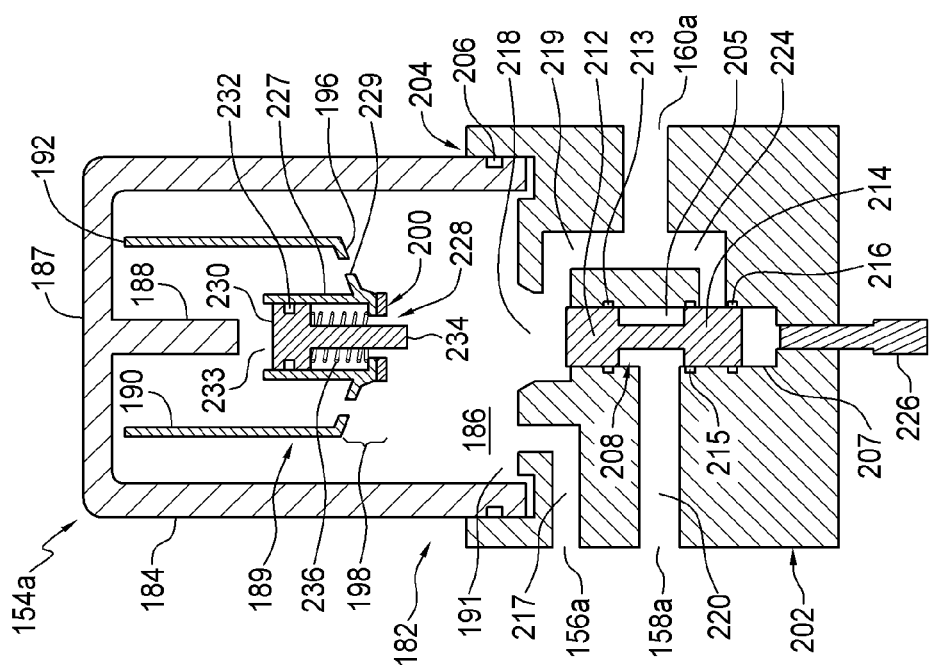

VALVE APPARATUS FOR SELECTIVELY DISPENSING LIQUID FROM A PLURALITY OF SOURCES

BACKGROUND OF THE INVENTION

1. Field of the Invention

The present invention relates to a valve apparatus and system therefor. More particularly, it relates to a valve apparatus and system for dispensing liquid.

2. Description of the Related Art

FIG. 1 shows a typical single-keg, system of dispensing beer 10 that is presently used. The assembly includes a source of beer in this example a keg 18 for supplying beer to bars and pubs. The keg 18 is kept in a special cooler room at a specified temperature. The keg 18 has a top 15 and bottom 17.

The assembly 10 includes a high pressure carbon dioxide gas tank 12 that operatively connects to the keg 18 via hose 16. A pressure regulator 14 decreases the carbon dioxide pressure supplied by the tank 12 to that specified by the brewer. This is approximately 15 PSI. It is this lower pressure gas that is fed to the top 15 of the keg 18 over the beer therewithin. A beer supply outlet 21 extends from the very bottom 17 of the keg 18 through a pipe inside the keg (not shown but well known in the art). The beer supply outlet 21 attaches to a hose 23 that is connected to a foam-on-beer detector check-valve 20.

The foam-on-beer detector check-valve 20 is known to those skilled in the art. In this example the foam-on-beer detector check-valve 20 is a foam-on-beer unit known as DFC9500. The DFC9500 is only one of many foam-on-beer units available. The DFC95000 is readily available for purchase at Pacific Beer Equipment Ltd. It is displayed and listed on Pacific Beer Equipment Ltd.'s web site www.pacificbeerequipment.com under the heading of "distribution". Other technical information for this foam-on-beer detector check-valve 20 is within this site as well.

The foam-on-beer detector check-valve 20 includes a float chamber (not shown), a float (not shown) within the chamber, an inlet 22 and an outlet 24. The foam-on-beer detector check-valve 20 is interposed between the keg 18 and a faucet 26 via hose 23 and a faucet line 19 to prevent the carbon dioxide gas from reaching the dispensing faucet 26 when the keg 18 runs out of beer.

Under the pressure of 15 PSI from the carbon dioxide tank 12, beer inside the keg 18 is forced up the pipe within the keg, through the beer outlet line 21, through the hose 23, through the foam-on-beer detector check-valve 20 and out to the faucet line 19 to the dispensing faucet 26. It is only when there is no more beer in the keg 18 that carbon dioxide begins passing through the beer outlet line 21 and into the foam-on-beer detector check-valve 20. When sufficient carbon dioxide enters the float chamber, the float can no longer float and it drops into its seat at the base of the chamber where a seal shuts the flow of beer to the faucet 26. At this point, an attendant has to replace the empty keg 18 with a full one and bleed the foam-on-beer detector check-valve 20 before beer supply can flow again.

It is preferable however to connect more than one keg to a faucet so that the beer dispensing is not interrupted while the empty keg is being replaced. Currently, at least two methods are being used to accomplish this.

One known method is that of connecting the kegs in series. That is, connecting the outlet of one keg to the carbon dioxide inlet of a second keg and the outlet of the second keg to the carbon dioxide inlet of a third keg, etc. This method is not ideal, primarily for two reasons. First, the more kegs that are connected, the more carbon dioxide gas pressure is required. This makes it difficult to maintain the accurate, carbon dioxide pressure specified by the brewer. The carbon dioxide pressure affects the taste of the beer as well as the beer's foam content. Second, a keg of beer is occasionally spoiled. When this happens, it results in cross-contamination of spoiled beer to the other kegs when connected in series. This requires the entire lot of connected kegs to be replaced, which is costly. The suspension of service due to the system being shut down and thoroughly cleaned and the kegs being replaced, is also costly.

Another known method of connecting kegs together is by relying on conventional solenoid valves. Electric power is required to operate the solenoid valves and the associated control electronics. However power is often not available in a cooler-room. The number of parts and their complexity makes this method more costly. A regular system cleaning becomes more complex and time consuming. This leads to further increased costs and difficulties.

Accordingly there is a need for an improved valve apparatus and system for dispensing liquid that reduces costs, delays, cross-contamination, cleaning difficulties in addition to solving other issues.

BRIEF SUMMARY OF INVENTION

An object of the present invention is to provide an improved valve apparatus and system for selectively dispensing liquid that overcomes the above disadvantages.

More particularly, according to one aspect, the present invention provides a valve apparatus for selectively dispensing beer. The apparatus includes a valve body having a first inlet for communication with a first source of beer. The valve body has a second inlet for communication with a second source of beer. The valve body also has an outlet for dispensing the beer. A passageway communicates with the first inlet, the second inlet and the outlet. A valve member is disposed within the passageway. The valve member inhibits communication between the first inlet and the second inlet and, in a first position, between the second inlet and the outlet. The valve body includes a float chamber communicating with the first inlet and the outlet. The apparatus also includes a float member disposed within the float chamber. The float member is buoyant and is operatively engageable with the valve member. The float member is displaceable upwards to enable communication between the first inlet and the outlet when the first source of beer at least partially fills the float chamber. When the first source of beer is depleted, the float member lowers to seal the first inlet from the outlet. The valve member moves to a second position thereby to enable the second inlet to be in communication with the outlet for dispensing beer from the second source.

According to another aspect, there is provided a system for selectively dispensing beer. The system includes a first source of beer, a second source of beer, and a third source of beer. The system includes a first valve apparatus having a valve body. The valve body has a first inlet in communication with the first source of beer. The valve body has a second inlet in communication with the second source of beer. The valve body has an outlet for dispensing beer out of the first valve apparatus. A passageway communicates with the first inlet, the second inlet and the outlet. A valve member disposed within the passageway inhibits communication between the first inlet and the second inlet and, in a first position, between the second inlet and the outlet. The valve body includes a float chamber communicating with the first inlet and the outlet. A float member is disposed within the float chamber. The float member is buoyant and operatively engageable with the valve member. The float member is displaceable upwards to enable communication between the first inlet and the outlet when the first source of beer at least partially fills the float chamber. When the first source of beer is depleted, the float member falls to seal the first inlet from the outlet. The valve member moves to a second position thereby to enable the second inlet to be in communication with the outlet for dispensing beer out of the first valve apparatus from the second source.

The system includes a second valve apparatus having a valve body with a first inlet in communication with the outlet of the first valve apparatus. The valve body of the second valve apparatus has a second inlet in communication with the third source of beer. The valve body of the second valve apparatus has an outlet for dispensing beer out of the second valve apparatus. The valve body of the second valve apparatus has a passageway communicating with the first inlet of the second valve apparatus, the second inlet of the second valve apparatus and the outlet of the second valve apparatus. The valve body of the second valve apparatus has a valve member disposed within the passageway of the second valve apparatus. The valve member of the second valve apparatus inhibits communication between the first inlet of the second valve apparatus and the second inlet of the second valve apparatus. In a first position, the valve member of the second valve apparatus inhibits communication between the second inlet of the second valve apparatus and the outlet of the second valve apparatus. The valve body of the second valve apparatus has a float chamber communicating with the first inlet of the second valve apparatus and the outlet of the second valve apparatus. The valve body of the second valve apparatus has a float member disposed within the float chamber of the second valve apparatus. The float member of the second valve apparatus is buoyant and is operatively engageable with the valve member of the second valve apparatus. The float member of the second valve apparatus is displaceable upwards to enable communication between the first inlet of the second valve apparatus and the outlet of the second valve apparatus when one from the group consisting of the first source of beer and the second source of beer at least partially fills the float chamber. When both the first source of beer and the second source of beer are depleted, the float member of the second valve apparatus falls to seal the first inlet of the second valve apparatus from the outlet of the second valve apparatus. The valve member moves to a second position thereby to enable the second inlet of the second valve apparatus to be in communication with the outlet of the second valve apparatus for dispensing beer from the third source.

According to a further aspect, there is provided a valve apparatus for selectively dispensing liquid. The apparatus includes a valve body having a first inlet for communication with a first source of liquid. The valve body has a second inlet for communication with a second source of liquid. The valve body has an outlet for dispensing liquid. The valve body includes a float chamber that communicates with the first inlet and the outlet. The apparatus has a valve member in the valve body operatively interposed between the first inlet and the second inlet for inhibiting communication thereby. In a first position, the valve member is operatively interposed between the second inlet and the outlet for inhibiting communication therebetween. The apparatus includes a float member disposed within the float chamber. The float member is buoyant and operatively engageable with the valve member. The float member rises within the float chamber to allow liquid from the first source to pass from the first inlet and through to the outlet. When the first source of liquid is depleted, the float member lowers to seal the first inlet from the outlet. The valve member moves to a second position thereby to enable the second inlet to be in communication with the outlet for dispensing liquid from the second source.

BRIEF DESCRIPTION OF DRAWINGS

The invention will be more readily understood from the following description of preferred embodiments thereof given, by way of example only, with reference to the accompanying drawings, in which:

FIG. 3 is a sectional view of a valve apparatus according to one embodiment of the present invention having a float member that is raised to allow communication between a first inlet and an outlet;

FIG. 4 is a sectional view of the valve apparatus of FIG. 3 with the float member lowered to allow communication between a second inlet and the outlet;

FIG. 5 is a sectional view of the valve apparatus according to another embodiment of the present invention having a float member that is raised to allow communication between a first inlet and an outlet;

FIG. 6 is a sectional view of the valve apparatus of FIG. 5 with the float member lowered to allow communication between a second inlet and the outlet;

DESCRIPTION OF THE PREFERRED EMBODIMENTS

Figure 1:
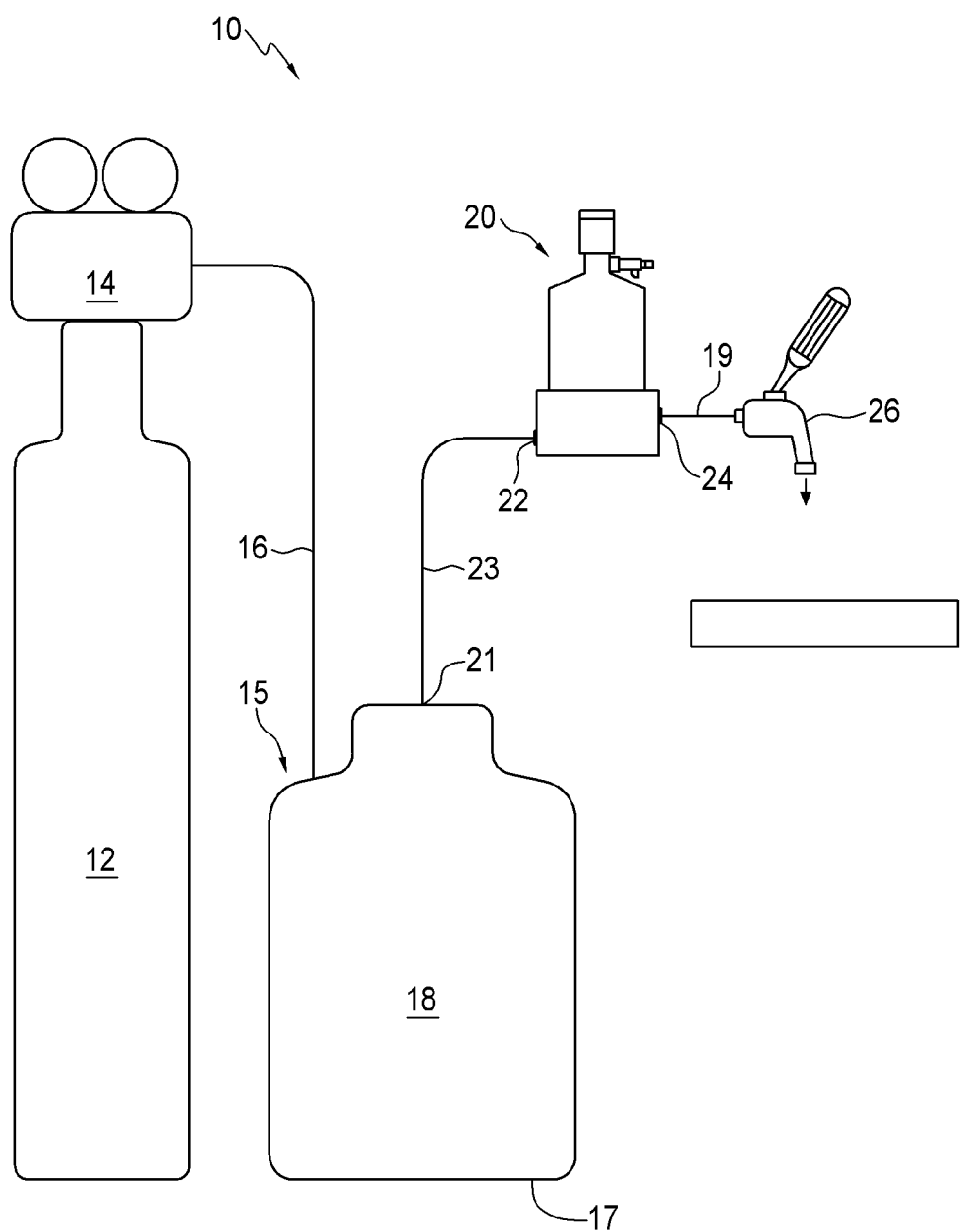
FIG. 1 is a schematic view of a system of dispensing beer according to the prior art.
Figure 2:
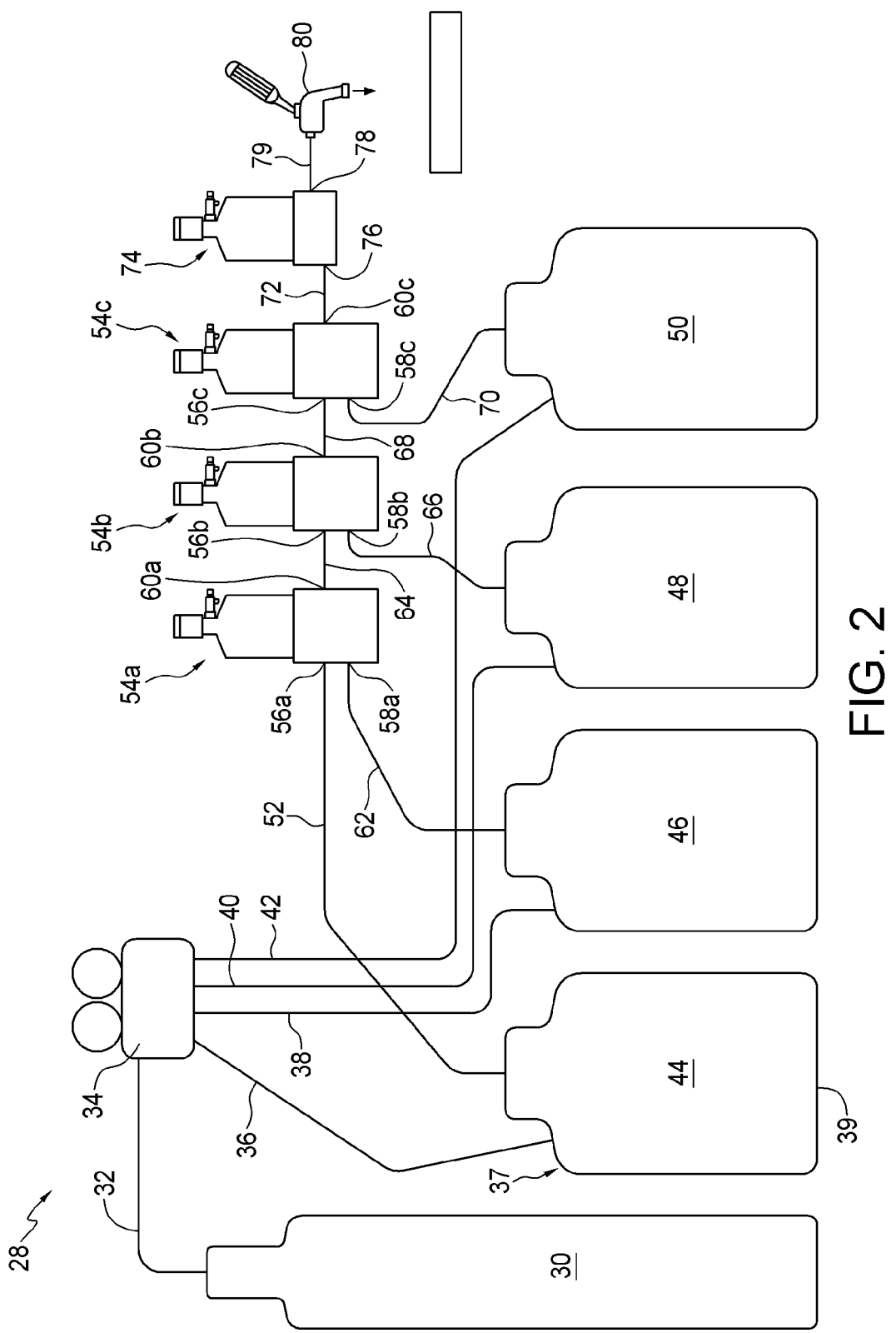
FIG. 2 is a schematic view of a system of dispensing liquid according to one aspect of the present invention.

Referring to the drawings and first to FIG. 2, there is provided a system 28 for dispensing liquid, in this example beer although the system is also useful for other liquids. The system 28 includes a carbon dioxide tank 30. The tank 30 is a conventional and contains carbon dioxide at high pressure. The system includes a pressure regulator manifold 34. The pressure regulator manifold 34 is conventional and lowers the pressure of the carbon dioxide gas in this example to about 15 PSI. The system includes a plurality of sources of liquid, in this example a first keg 44, a second keg 46, a third keg 48, and a fourth keg 50. Each keg contains beer in this example and has a top 37 and bottom 39, as shown by the first keg 44. The kegs 44, 46, 48, and 50 are each individually connected at their tops to the pressure regulator manifold 34 via hoses 36, 38, 40 and 42 respectively. The kegs are thereby pressurized.

The system 28 includes a plurality of valve apparatuses in this example a first valve apparatus 54a, a second valve apparatus 54b, and a third valve apparatus 54c. The valve apparatus 54a has a first inlet 56a, a second inlet 58a, and an outlet 60a. The first inlet 56a is in communication with the first keg 44 via hose 52. The second inlet 58a is in communication with the second keg 46 via hose 62. The second valve apparatus 54b has a first inlet 56b, a second inlet 58b and an outlet 60b. The first inlet 56b of the second valve apparatus 54b is in communication with the outlet 60a of the valve apparatus 54a in this example via hose 64. The second inlet 58b of the second valve apparatus 54b is in communication with the third keg 48 via hose 66. The third valve apparatus 54c has a first inlet 56c, a second inlet 58c, and an outlet 60c. The first inlet 56c of the third valve apparatus 54c is in communication with the outlet 60b of the second valve apparatus 54b in this example via hose 68. The second inlet 58c of the third valve apparatus 54c is in communication with the fourth keg 50 via hose 70.

The outlet 60c is in communication with a foam-on-beer detector check-valve 74 via hose 72. The foam-on-beer detector check-valve 74 is known to those skilled in the art. It may for example be the DFC9500 described at and readily available for purchase at www.pacificbeerequipment.com, the information from the web site in this regard being hereby incorporated by reference. The foam-on-beer detector check-valve 74 includes a float chamber (not shown), a float (not shown) within the chamber, an inlet 76 and an outlet 78. The system includes a faucet 80 for dispensing liquid. The faucet 80 is in communication with the outlet 78 of the foam-on-beer detector 74 via hose 79.

Each of the valve apparatuses 54a, 54b, 54c and the components therein are substantially the same. Accordingly, only valve apparatus 54a is hereafter described in detail with the understanding that the second valve apparatus 54b and the third valve apparatus 54c have a similar structure and function. For the second valve apparatus 54b and the third valve apparatus 54c, like parts have been given like reference numerals as the valve apparatus 54a with the designations "b" and "c", respectively, replacing designation "a".

Referring now to FIG. 3, this shows the valve apparatus 54a in greater detail. The valve apparatus 54a includes a valve body 82. The valve body 82 has an upper portion, in this example, forming a float chamber 84, and a lower portion 102. The float chamber 84 has an open-ended bottom 91 that is, in this example, threadably received within an aperture 104 of the lower portion 102. An o-ring 106 extends around the bottom 91 to sealably engage the float chamber 84 with the lower portion 102. The float chamber 84 has a closed top 87 opposite the bottom 91. A stop 88 extends outwards from the top 87 towards the bottom 91. The float chamber 84 has a hollow interior 86 between the top 87 and the bottom 91.

A float member 89 is disposed within the float chamber 84. The float member 89 is buoyant with a buoyant portion 90 that floats when liquid at least partially fills the interior 86 of the float chamber 84. FIG. 3 shows a mode where the liquid (not shown) at least partially fills the interior 86. The float member 89 is shown in a floating position in FIG. 3 in a raised mode. The float member 89 has a top 92. The top 92 of the float member 89 may abut the stop 88 as shown in FIG. 3 when the float member 89 is in the raised mode.

The float member 89 has an end portion 98 opposite the top 92. The end portion 98 is inwardly tapered and extends towards the bottom 91 of the float chamber and is in the form of a plug 100. The plug 100 in this example includes an o-ring 121 extending therearound.

A valve member 108 is in the valve body. The float member 89 is operatively engageable with the valve member 108. In this example the float member 89 is operatively engageable with the valve member 108 by way of a fixed connecting member 103 extending from the plug 100 that links together the valve member 108 with the float member 89. The valve member 108 has a first blocking portion, in this example a first land 112, that is connected to the connecting member 103.

The valve member 108 has a second blocking portion, in this example a second land 114 which is spaced-apart from the first land 112. The valve member 108 has a recess, in this example a cut-out portion 105 interposed between the first land 112 and the second land 114.

The lower portion 102 of the valve body 82 has a passageway 107 which slidably receives the valve member 108. The passageway 107 has a first aperture 118 axially aligned with the plug 100 and a second aperture 122 spaced-apart from the first aperture 118. Depending on the position of the float member 89 and the valve member 108, the passageway 107 is capable of communicating with the first inlet 56a, the second inlet 58a and the outlet 60a.

The valve member 108 inhibits communication between the first inlet 56a and the second inlet 58a. In this example the first land 112 of the valve member 108 stops the first inlet 56a from communicating with the second inlet 58a. An O-ring 113 mounted to the lower portion 102, disposed within the passageway 107 and abutting the first land 112. Therefore land 112 blocks passageway 107 between the first inlet 56a and the second inlet 56b.

In the raised mode of the float member 89 shown in FIG. 3, the valve member 108 is in a first position that inhibits communication between the second inlet 58a and the outlet 60a. In this example the second land 114 blocks passageway 107 between the second inlet 58a and outlet 60a and stops the second inlet 58a from communication with the outlet 60a. An o-ring 115 mounted to the lower portion 102, disposed within the passageway 107 and abutting the second land 114, assists in stopping the flow of liquid.

The valve body 82 in this example includes a float lifter 126 slidably disposed partially within the passageway 107 of the lower portion 102. However this is not necessary in other embodiments. When the float lifter 126 is engaged upwards from the perspective of FIG. 3, it abuts against the valve member 108 which actuates the float member 89 upwards to abut the stop 88. The float lifter 126 then returns through gravity downwards from the perspective of and in the position shown in FIG. 3. There is an o-ring 116 mounted to the lower portion 102, disposed within the passageway 107 adjacent to the float lifter 126 and spaced-apart from the O-ring 115. The second land 114 inhibits fluid from reaching the float lifter 126 by abutting with the o-ring 116 and blocking passageway 107.

The lower portion 102 of the valve body 82 includes a passageway 117 which extends between the first inlet 56a and the interior 86. The lower portion 102 includes a passageway 120 which extends between the second inlet 58a and passageway 117 adjacent the cut-out portion 105 of the valve member 108. The lower portion 102 includes a passageway 119 which extends between the interior 86 and the outlet 60a when the float member 89 is in the raised mode of FIG. 3 and thus enables communication between the first inlet and the outlet. The lower portion 102 includes a passageway 124 which extends between passageway 117 and outlet 60a and enables communication between the second inlet 58a and the outlet 60a when the float member 89 is lowered to the position shown in FIG. 4.

Referring to FIG. 4 this shows the valve apparatus when the float chamber 84 substantially depleted of liquid (the liquid is not shown). The float member 89 is therefore lowered with its plug 100 sealably engaging aperture 118 of the lower portion 102 of the valve body 82. The float member 89 has pushed the valve member 108 to a second position. In this example the valve member 108 is pushed downwards from the perspective of FIG. 4. The first inlet 56a is thereby inhibited from communicating with the outlet 60a since plug 100 seals aperture 118. The second inlet 58a is now in communication with the outlet 60a via passageway 117 and cut-out portion 105 of the valve member 108.

In operation and referring to FIGS. 2 to 4, when liquid, in this example beer, is within kegs 44, 46, 48, 50, the tank 30 applies pressure through the pressure regulator manifold 34 to the kegs via hose 32, and hoses 36, 38, 40 and 42, respectively. The pressure causes beer from the first keg 44 to pass via hose 52 to the first inlet 56a of the valve apparatus 54a. Referring to FIG. 3, beer will fill the interior 86 of the float chamber 84 and cause the float member 89 to rise. Beer from the first keg 44 will pass through aperture 118 and flow through the outlet 60a.

Referring to FIG. 2, beer from the second keg 46 will pass through hose 62 to the second inlet 58a. As shown in FIG. 3, the valve member 108 is positioned to inhibit communication between beer from the second keg 46 and the outlet 60a. In this way the valve apparatus 54a inhibits contamination of beer between the first keg 44 and the second keg 46. Referring to FIG. 2, so long as there is beer in the first keg, it will pass through the outlet 60a, through hose 64 and into the first inlet 56b of the second valve apparatus 54b. As before this will cause the float member of the second valve apparatus 54b to rise, allowing beer from the first keg 44 to pass through to outlet 60b. Beer from the third keg 48 will pass via hose 66 to the second inlet 58b and be blocked as before via the valve member of the second valve apparatus 54b. This ensures that there is no contamination between the third keg and the first and second kegs. The beer from the first keg 44 passes via hose 68 to the first inlet 56c of the third valve apparatus 54c. As before the beer causes the float member of the valve apparatus 54c to rise, allowing beer from the first keg to pass through outlet 60c. Beer from the fourth keg passes through hose 70 to the second inlet 58c and is blocked as before by the valve member of the third valve apparatus 54c. Beer from the first keg 44 next passes through the conventional foam-on-beer detector check-valve 74 via its inlet 76 and outlet 78, through hose 79 and finally through the faucet 80.

When the first keg is substantially empty of beer, the float chamber 84 is no longer filled with liquid and this causes the float member 89 to lower to the position shown in FIG. 4. Also pressurized gas enters through the inlet 56a and acts upon the float member 89 to lower it. The plug 100 via o-ring 121 sealably engages with the aperture 118 of the lower portion 102 of the valve body 82. This inhibits communication between the first inlet 56a and the outlet 60a, inhibiting pressurized gas from exiting through the outlet and sealing the empty first keg 44 from the rest of the system. The float member 89 in the lowered position engages the valve member 108 via the fixed connection member 103. The valve member 108 is moved (in this example lowered) to the second position as seen in FIG. 4 such that the second land 114 no longer inhibits communication between the second inlet 58a and the outlet 60a. Beer from the second keg 46 may now pass through the second inlet 58a, through the passageway 118 and past cut-out portion 105 of the valve member, and through to the outlet 60a. Beer from the second keg 46 then passes through the hose 64, first inlet 56b, outlet 60b, hose 68, first inlet 56c, outlet 60c, hose 72, foam-on-beer detector check-valve 74, hose 79 and faucet 80 as before. Beer from both the third keg 48 and the fourth keg 50 remains as before blocked from contaminating the second keg 46 via the valve members of the second valve apparatus 54b and the third valve apparatus 54c, respectively. When the second keg 46 is empty, as before the float member of the second valve apparatus 54b lowers, sealing the second keg off and allowing beer from the third keg to now pass through outlet 60b, hose 68, first inlet 56c, outlet 60c, hose 72, foam-on-beer detector check-valve 74, hose 79 and faucet 80 as before. Beer from the fourth keg 50 remains blocked by the valve member of the third valve apparatus 54c. Lastly when the third keg 48 is empty, the float member of the third valve apparatus 54c lowers and seals it off, engaging the valve member in this example downwards to allow beer from the third valve apparatus 54c to pass through to the faucet 80.

FIGS. 5 and 6 show a valve apparatus according to another embodiment of the invention. Like parts have like numbers and function to those FIGS. 3 and 4 with the additional 100 added to the numerals. The float member 189 is hollow and has an open top 192. In this example, the float member 189 is buoyant because it is made of polyurethane with a specific gravity less than beer/water. The end portion 198 has a tapered portion 196 having an aperture 229. The float member 189 includes a piston 230 slidably disposed within a cylinder 227. The cylinder has a first open end 228 facing the valve member 208 and a second open end 233 opposite the first open end 228. The second open end 233 is exposed to the interior 186. The open ends 228 and 233 allow the pressure from the interior 186 of the float chamber 184 to reach the piston 230. The piston 230 sealably abuts the cylinder 227 via an o-ring 232 partially embedded within the piston 230. The piston 230 is spring-biased upwards from the perspective of FIG. 5 via resilient member 236 (a coil spring in this example) disposed within the cylinder 227 and will remain in this position in the absence of a pressure differential. When the float member 189 is buoyant in beer, the first open end 228 allows the piston 230 to be exposed to the same pressure as in the interior 186 of the float chamber 184. With both sides of the piston at equal pressure, the piston cannot move, and it remains in its upwards position under the control of the resilient member 236.

A piston rod 234 extends downwards from the piston 230 from the perspective of FIG. 5 and through the open end 228. The piston rod 234 as shown in FIG. 5 is in a retracted position. The piston rod 234 has a smaller cross-sectional area compared to the piston 230. The piston 230 is only pressurized when the float member 189 drops down to seal aperture 218 as seen in FIG. 6. The piston rod 234 is then used to actuate the valve member 208 below it.

In operation, when beer from the first keg 44 enters the first inlet 156a, the float member 189 rises and beer may pass through the outlet 160a and continue through the rest of the valve apparatuses as before. When the first keg 44 is empty, beer drains from the float chamber 184, including past aperture 229. The float member 189 falls by gravity and due to gas pressure exerted against the piston 230. The piston 230 will slide in the direction of less pressure. The piston 230 in this example lowers from the perspective of FIG. 5, with the plug 200 sealably engaging aperture 218 of the lower portion 202 as shown in FIG. 6. Pressure exerted on the piston 230 is transmitted and amplified onto the piston rod 234 because of the smaller cross section of the piston rod. The resilient member 236 is caused to compress and the piston rod 234 forces the valve member 208 to move to a second position, in this example downwards from the perspective of FIGS. 5 and 6 and as shown in FIG. 6. This enables the second inlet 158a to now be in communication with the outlet 160a. The rest of the system operates in a similar manner as before with the valve apparatuses of FIGS. 3 and 4.

The surface area of the plug 200 affects the actuating force available. The piston rod or similar actuator can be designed to provide sufficient force as required for the application. In the valve apparatus shown in FIGS. 5 and 6, the pressure to operate the actuating piston 230 comes from the pressure inside the float chamber 184 when the float member 189 drops and seals the seat or aperture 218. Until purposely de-pressurized, the pressure in the float chamber 184 remains unchanged, whether the float chamber 184 is filled with beer or $CO_2$. In reality, some beer still remains in the float chamber 184 when the float member 189 drops, but not enough to sustain buoyancy.

When the faucet is closed, the pressure in the float chamber 184, created by the gas pressure and hydraulic fluid pressure, remains at 15 PSI, whether the float is buoyant or not. The position of the float member is affected by the contents of the chamber, either beer or $CO_2$; that, in turn, affects the pressure differential in the actuating piston 230, which occurs the moment the plug 200 drops on the seal-seat or aperture 218.

When the float member 189 falls onto aperture 218, a seal is made. This causes two events: firstly, the seal seals the medium inside the float chamber 184, now consisting of partly of beer and partly of $CO_2$, to prevent the $CO_2$ from escaping through the outlet 160a. This event, in effect, shuts the flow from the first keg. Secondly, it exposes the lower face of the piston to the outlet line which is connected to the faucet. At this time, if the faucet is open, the pressure in the outlet line will drop, creating a pressure differential between the upper face and lower face of the piston. This pressure differential causes the piston to slide in this example downward and causes the piston rod 234 to actuate the valve member, positioned just below it. Once actuated, the valve member provides a secondary seal for the now-empty first keg and it causes the second keg to be diverted to the outlet line, which will automatically continue to supply beer to the faucet.

The invention in one respect is directed to the float member 289 with the piston 233 disposed therein.

Figure 7:
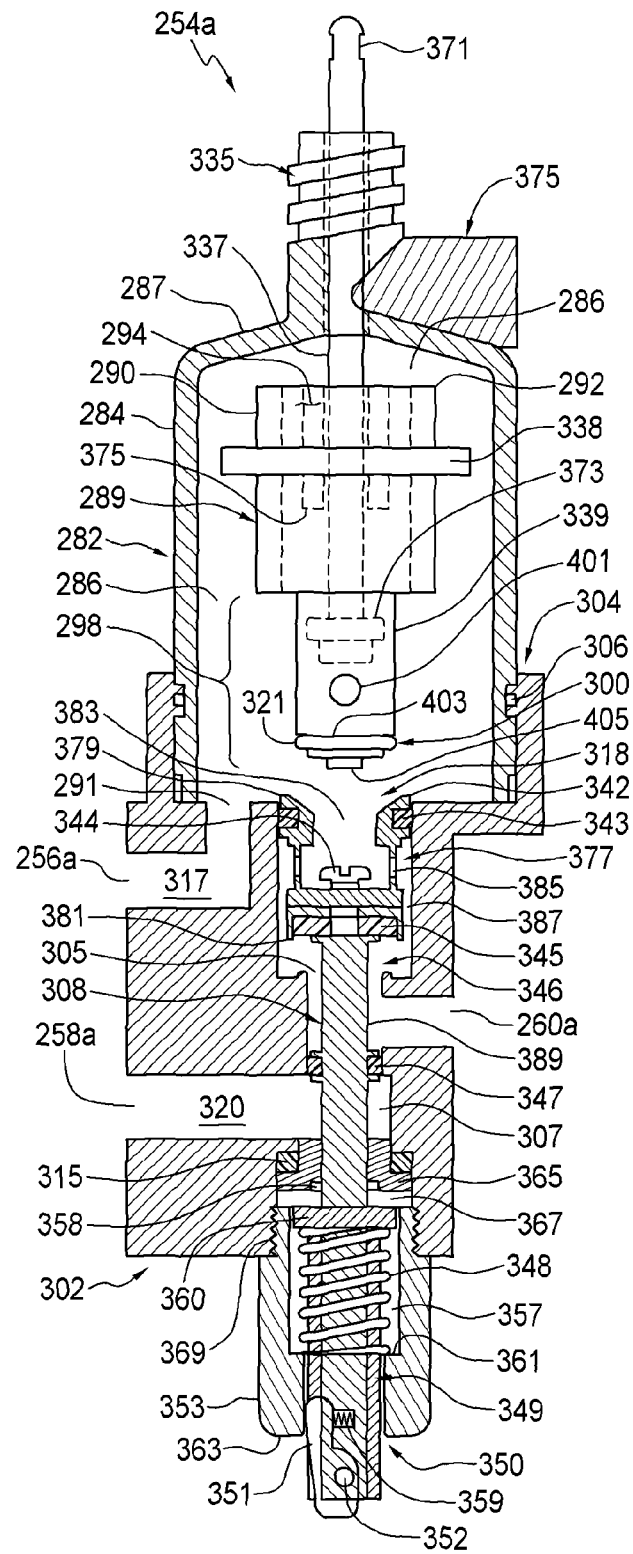
FIG. 7 is a sectional view of the valve apparatus according to a further embodiment of the present invention having a float member that is raised to allow communication between a first inlet and an outlet.
Figure 8:
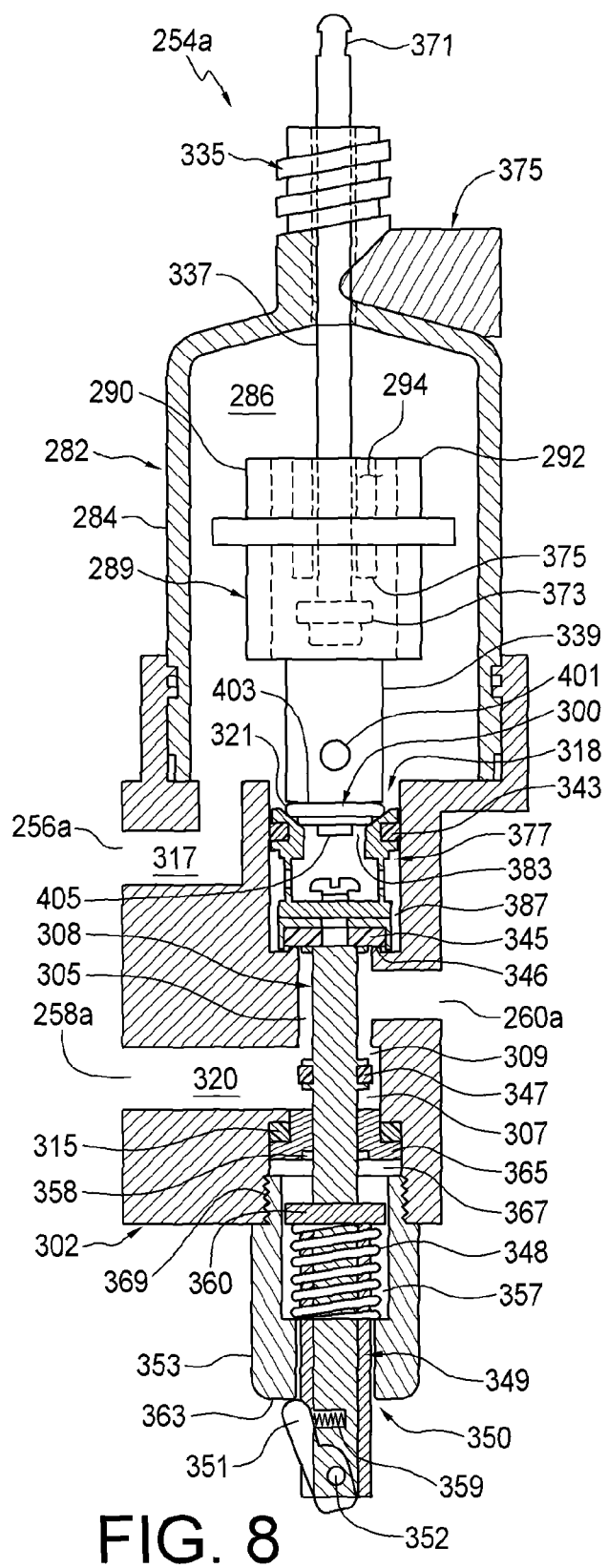
FIG. 8 is a sectional view of the valve apparatus of FIG. 7 with the float member lowered to allow communication between a second inlet and the outlet.

A further embodiment of the invention is shown in FIGS. 7 and 8. Like parts have like numbers and function to those FIGS. 3 and 4 with the additional 200 added to the numerals. The valve body 282 includes a threaded portion 335 extending from top 287. A bleeding apparatus 375 is disposed at the top 287 adjacent to the threaded portion 335. The bleeding apparatus 373 is in communication with the interior 286 of the float chamber 284. It allows gas or pressure to be bled from the chamber 284. This is useful for example to allow liquid or beer to fill the interior 286 of the valve body 282 completely when setting up a new keg. Such a feature is well known in the art and therefore not described in further detail.

The valve body 282 includes a rod 337 having a first end 371 near the threaded portion 335. The rod 337 extends through the interior 286 of the float chamber 284 to within an interior 294 of the float member 289. The rod 337 has a second end 373 spaced-apart from the first end 371 and disposed within the float member 289. A knob (not shown) may engage with the threaded portion 335 and the first end 371 of the rod 337 for manually raising or lowering the rod 337 from the perspective of the figures. When the rod 337 is raised, the second end 373 of the rod 337 is engageable with a portion 375 of the float member 289, located within the interior of the float member 289, for thereby manually raising the float member 289 if required. Such features are known in the art and therefore not described in more detail.

The float member 289 includes a flange-like lateral member 338 radially extending outwardly therefrom. The rod 337 and member 338 perform the function of centering the float member 289 within the float chamber 284.

The float member 289 has an end portion 298. The float member 289 may also be made of polypropylene with a specific gravity less than beer/water. The end portion 298 includes an extended portion 339 that is hollow. The extended portion 339 has an aperture 401. The aperture 401 allows liquid or beer from within the interior 294 of the float member 289 to freely flow out of it to the interior 286 of the float chamber 284. The extended portion 339 includes a plug 300. The plug 300 has a top 403 and a bottom 405 spaced apart from the top 403. An O-ring 321 extends around the plug 300.

Valve member 308 has a first end portion 342, a central portion in this example a shaft 389, and a second end portion 349 spaced-apart from the first end portion 342 by the shaft 389. A piston member 377 is located at a first end portion 342 of the valve member 308. The piston member 377 is disposed within a first aperture 318 at the top of passageway 307. The piston member 377 has a top 379 facing the float member 289. The piston member 377 has a piston aperture 383 located at the top 379 and passing inwards therefrom. The top 379 together with the piston aperture 383 act as a seat for receiving plug 300 of the float member 289. The plug 300 is shaped to seal the piston aperture 383 when the float member 289 is lowered from the perspective of the figures and as shown in FIG. 8.

A seal, in this example, a u-cap seal 343 extends around the piston member 377 adjacent to the top 379. The u-cap seal 343 abuts with the valve body 282 in passageway 307 and inhibits liquid from passing therebetween. The "U" part of the seal 343 is disposed upwards from the perspective of the figures, at least partially facing the interior 286 of the float chamber 284. Therefore, when the float member 289 is lowered from the perspective of the figures and as shown in FIG. 8, both seal 321 on the plug 300 and u-cap seal 343 act to inhibit communication between the first inlet 256a and the outlet 260a. U-cap seals are useful because they provide very little friction in the downward direction from the perspective of the figures. Also, u-cap seals expand or tend to flatten outwards and thereby better promote sealing when there is a pressure differential between its sides.

The piston member 377 has a bottom 381 spaced-apart from the top 379. The bottom 381 in this example is shaped to receive a seal, in this example, a u-cap seal 345. The valve body 282 has a seat 346 about the passageway 307 between the first inlet 256a and the outlet 260a. The seat 346 is disposed near the bottom 381 of the piston member 377. The bottom 381 together with the u-cap seal 345 are shaped to cover the seat 346 in the position shown in FIG. 8. In this manner, bottom 381 and u-cap seal 345 inhibit communication between the first inlet 256a and the outlet 260a.

The piston member 377 connects to the rest of the valve member 308 through a centrally disposed screw 344, though other means could be used. Those skilled in the art will appreciate that the piston member 377 may connect to the rest of the valve member 308 through other ways. For example, the piston member could snap together with the rest of the valve member through a snap-on connection. Some other fastening device may be used. Alternatively, the piston member may be integral with the rest of the valve member as a single, whole part.

Figure 9:
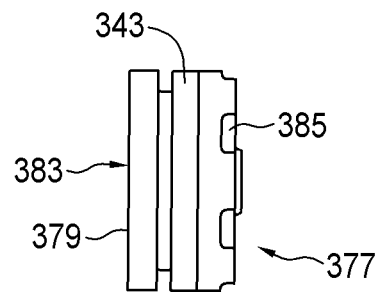
FIG. 9 is an elevation view of part of a piston member illustrated in FIG. 7.
Figure 10:
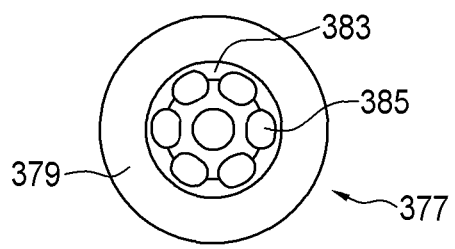
FIG. 10 is a top perspective view of the part of the piston member of FIG. 9.
Figure 11:
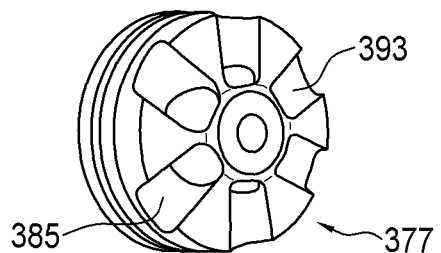
FIG. 11 is a bottom perspective view of the part of the piston member of FIG. 9.

The piston aperture 383 includes a passage 385 between the top 379 and the bottom 381. The passage 385 radially extends outwards and extends between the inside of the piston member 377 and passageway 307, allowing communication between interior 286 of the float chamber and passageway 307. Referring now to FIGS. 9 to 11, these show part of the piston member from the top 379 through to the passage 385 according to one example of the piston member. FIG. 9 is an elevation view of this part of the piston member, FIG. 10 is a top perspective view thereof, and FIG. 11 is a bottom perspective view thereof. In this example the passage 385 comprises a plurality of spaced-apart, radially extending slots 393 as best shown in FIG. 11. The spacing and dimensions of the slots 393 are advantageous for promoting the flow of liquid therethrough.

Referring back to FIG. 7, an annular space 387 is located in passageway 307 adjacent to the piston member 377 between the passage 385 and the bottom 381. The piston aperture 383 and space 387 therefore allow liquid to pass from the top 379 of the piston member 377 through passage 385 and through space 387 past the bottom 381 of the piston member 377, as for example may be seen in FIG. 7.

The valve member 308 has a seal 347 in passageway 307 between the second inlet 258a and the outlet 260a which engages the valve body 282 and inhibits communication between the second inlet 258a and outlet 260a when the valve member is in a first position with the float member 289 in the floating mode of FIG. 7. As the valve member 308 is actuated to a second position, in this example, a lowered mode as illustrated in FIG. 8, the seal 347 is pushed free of the valve body 282 to enter enlarged portion 309 of passageway 307 and allow the second inlet 258a to communicate with the outlet 260a through cut-out portion 305 of the valve member 308 as shown in FIG. 8.

A bushing 365 extends around the valve member 308 adjacent to passageway 320 and within passageway 307. An outer seal 315 is disposed between the bushing 365 and the lower portion 302 of the valve body 282. An inner seal 358 is disposed between the bushing 365 and the valve member 308. A washer 367 extends around the valve member 308. The washer 367 abuts the bushing 365 from below from the perspective of FIG. 7.

The valve member 308 has a second end portion 349 opposite the first end portion 342. The second end portion 349 passes through the lower portion 302 of the valve body 282 below passageway 307.

A hollow spring housing 353 threadably engages with the lower portion 302 of the valve body 282 via threads 369 so as to partially enclose the second end portion 349. The spring housing 353 includes an inner bore 357 and an outer bore 350 smaller than the inner bore 357. The inner bore 357 is in part adjacent to threads 369. The outer bore 350 extends away from the inner bore 357 to an outer end 363 of the spring housing 353. A shoulder 361 is located between the inner bore 357 and the outer bore 350. The valve member 308 includes a plunger 360 opposite the shoulder 361 and adjacent to the second end portion 349. A spring 348, a coil spring in this example, is located with the inner bore 357 between the plunger 360 and the shoulder 361.

The spring 348 is configured to bias the valve member 308 upwards from the perspective of FIG. 7. In this mode, the plunger 360 abuts the washer 367. The spring housing 353 threadably connects with the lower portion 302 of the valve body 282 via threads 369 so the spring housing 353 holds the washer 367 and the bushing 358 in place. The inner seal 358 and the outer seal 315 are thereby compressed. These act to seal the lower portion 302 of the valve body 282. They inhibit liquid located in passageways 320 and 307 from escaping downwards, from the perspective of FIG. 7, to and past the washer 367.

The valve member 308 includes a latch 351 mounted to the valve member 308 via pivot 352. In FIG. 7 the latch 351 is partially disposed within the outer bore 350. A spring 359 within the valve member 308 radially extends outwards to bias the latch 351 to abut the outer bore 350. When the valve member 308 is moved to the second position, in this example lowered from the perspective of FIGS. 7 and 8 and as shown in FIG. 8, the plunger 360 is lowered. The plunger 360 compresses the spring 348 thereby. Because the valve member 308 is lowered, the latch 351 in turn is lowered and pushed free from the outer bore 350 so as to abut the outer end 363 of the spring housing 353. This thereby latches the valve member 308 in the lowered configuration shown in FIG. 8. To return the valve member 308 to the raised position of FIG. 7, the latch 351 must be actuated or pushed to the right from the perspective of FIG. 8 and the spring 359 thereby compressed. The spring 348 then expands and pushes the valve member 308 upwards. The latch 351 is in turn pulled upwards thereby to again be at least partially within the outer bore 350, as shown in FIG. 7. The latch 351 also is useful for locking the apparatus 254a if, for example, there is a leak in the system that needs to be addressed or fixed.

Those skilled in the art will appreciate that the valve apparatus 245a of this embodiment may be used within the configuration shown in FIG. 2.

In operation, when liquid or in this example beer at least partially fills the interior 286 of the float chamber 284, the float member 289 buoys as shown in FIG. 7. The top 403 of the plug 300 is then submerged in the beer inside the float chamber 284 at an equal pressure, in this example 15 PSI, to the bottom 405 of the plug 300. The outlet 260a and the faucet line are also essentially at 15 PSI. The float member 289 therefore continues to float.

The piston member 377 is kept in the first position illustrated in FIG. 7 by the valve element 308, which is spring loaded via spring 348 to bias upwards from the perspective of FIG. 7. The top 379 and the bottom 381 of the piston member 377 are both at 15 PSI. Therefore the valve member 308 cannot move.

When the faucet so shown in FIG. 2 is opened, pressure drops within the interior 286 even while the float member 289 is buoyant. The pressure drop is an even drop throughout the float chamber 284, the faucet line, both top 403 and bottom 405 of the plug, and both top 379 and bottom 381 of the piston member 377. The float member 289 cannot therefore move downwards from its floating position of FIG. 7. Similarly, neither the top 379 nor bottom 381 of the piston member 377 can move downwards from the perspective of FIG. 7.

Beer passes from the first inlet 256a into interior 286 of the float chamber through the piston member 377 (via piston aperture 383, passage 385 and space 387), and through to the outlet 260a. The valve apparatus 254a therefore allows liquid or beer to flow from the first keg to the faucet line and it is ready to shut the flow from the first keg.

When liquid or beer from the first keg is depleted, the float member 289 drops through gravity. Pressure drops throughout the interior 286, including pressure at outlet 260a. The plug 300 engages with the top 379 and piston aperture 383 of the piston member 377. A seal is thereby created. This seals the medium, now consisting of partly beer and partly $CO_2$, inside float chamber 284 to prevent the $CO_2$ from escaping into the outlet 260a. This also shuts the flow from the first keg. $CO_2$ gas therefore builds pressure within the interior 286. In this example the pressure reaches upwards of 15 PSI.

The sealing caused by the float member 289 simultaneously isolates the top 379 of piston member 377 from the bottom 381. Suddenly there is a pressure differential between the top 379 of the piston member 377, which is typically near 15 PSI, and bottom 381 of the piston member 377 which is at a lower pressure and potentially exposed to an open faucet line. This pressure differential causes the piston member 377 to push towards the second position, in this example downwards from the perspective of the figures, until the bottom 381 sealably engages with seat 346 as shown in FIG. 8. The first inlet 256a and the outlet 260a are thereby sealed from each other.

Because pressure builds within the interior 286, this also results in a pressure differential between the top 403 of the plug 300, which may be near 15 PSI, and the bottom 405. This too therefore aids in causing the piston member 377 to be pushed to the second position, in this example downwards from the perspective of the figures. Therefore, both the piston member 377 and the float member 289 are forced to slide downwards in this example from the perspective of the figures, as a single unit, actuating the valve member 308 to also move downwards in this example.

Put another way, only when the float member 289 lowers and seals the piston aperture 383, via plug 300 with seal 321, does the piston member 377 in effect transform into a piston. Until then fluid can pass through piston aperture 383. The piston member 377 therefore selectively acts a piston when the float member 289 is lowered down upon it. Then, in response to the high pressure in the float chamber 289 that has built up, and to the low pressure in the open faucet, the piston member 377 slides down, causing the valve element 308 as a whole to actuate. This in turn switches the kegs.

Actuation of the valve apparatus 254a occurs when the faucet is open and a first keg connected to the first inlet is running out of beer. This is because actuation requires a change of state of the medium in the float chamber 284, that is, from beer to $CO_2$. Once actuated, the valve member 308 provides a secondary seal for the now-empty first keg via o-ring 345, and it causes a second keg connected to the second inlet to be diverted to the outlet 260a, which automatically continues to supply beer to the faucet line.

Advantageously therefore, the valve apparatus 254a allows beer to flow from the first keg to the faucet line and it is ready to shut the flow from the first keg, almost instantly, when the float member 289 drops.

Once the valve apparatus 254a has switched to the second keg position of FIG. 8, the valve apparatus 254a locks in this position via latch 351, and its automatic action is complete. The valve apparatus 254a including the valve member 308 remain locked until a manual reset is activated, such as pushing the latch 351 to the right from perspective of FIG. 8. In like manner, the valve member 308 can also be manually actuated by pushing to provide a "Set" function as opposed to a "Reset" function. This Set function is useful when servicing or bleeding the system. Or, if a contaminated keg is encountered, the Set function can be used to switch off the contaminated keg from the series of kegs. In such a case the cleanup would be reduced because the rest of the kegs in the system would not be contaminated; only the lines to the faucet.

Piston member 377 is preferably large enough to amplify force exerted against the valve member 308 as a whole. The piston member 377 should have a larger diameter than the shaft 389. This is because greater pressure, and therefore greater force, needs to be exerted on the top 379 of the piston member 377 (and top 403 of the float member 289) to overcome counter forces such as 1) friction between the valve member 308 and the valve body 282, 2) the elastic force of the spring 348, and 3) pressure from the second keg which presses against bottom 381 of the piston member 377. In one example, the valve member 377 has a diameter of 1⅛ inches, which is equal to about 1 square inch in area. The shaft 389 has a diameter of ⅜ inches. The maximum $CO_2$ pressure in this example is 15 PSI. The spring provides an upward compression force of about 3 to 4 lbs. Therefore, when 15 PSI is exerted on the top 379, about 15 pounds of force is exerted against the piston member 377 to push it downwards, overcoming friction and the spring 348, and towards its position shown in FIG. 8.

The invention according to another respect is directed to the piston member 377 that may be thought of as a piston with a hole in it that the float member 289 can plug.

The structure of the present invention provides many advantages. The valve apparatuses are very cost effective and can be considered a smarter foam-on-beer detector check-valve. That is because, in addition to shutting the empty first keg when the carbon dioxide reaches the float chamber, the valve apparatuses also open a line to a second, independent full keg, to provide uninterrupted beer flow. Because each of the kegs is sealed from each other, the valve apparatus prevents contamination between kegs. This results in considerable cost and time savings. For the embodiments of FIGS. 5 to 8, the valve member is provided with an amplifying-actuator that increases the force on the valve element.

Those skilled in the art will appreciate that some beer or other liquid may still be within the float chamber when the float member lowers downwards to plug communication between the first inlet and the outlet. Also, the first keg may not be completely empty by the time the second keg operates.

In all three embodiments, the valve member can be many types of valves or flow control devices used for various flow, such as: single or multiple element, two-way or three-way, spool or poppet type, etc. Each of the three embodiments may have certain advantages in certain applications, depending on medium involved, the volume of flow, pressure, cost, size, etc. The valve apparatuses can also be configured for different control functions, such as: allowing flow of a second or additional medium, gas or fluid, while a primary fluid is present in the float chamber, or vice versa. It can be used to divert one medium to port A or port B, or it can switch two sources, A and B, into an outlet port, etc.

Those skilled in the art will appreciate that while four kegs are shown in FIG. 2, the invention is applicable to two or more sources of liquid or kegs.

Instead of employing o-rings for inhibiting communication between the first inlet and the outlet, the plug at the end of the float member may simply be resilient.

Those skilled in the art will appreciate that seals described as part of the float member may alternatively be part of the valve member. Similarly, seals described as part of the valve member may alternatively be seals that are part of the valve body.

Those skilled in the art will appreciate that instead of the seat 346 and seal 345 arrangement of the piston member 377, a seal similar to seal 347 may be used in place of the seal 345 and related structure. Poppet valve seals and/or spool valves with related seals may be used in any number of combinations.

When the float member is lowered, a mechanism could be devised to cause the valve member to move upwards or in some other direction, instead of downwards. Thus the second position is not necessarily a downward position.

Those skilled in the art will appreciate that the spring housing 353, with related spring 348, latch 351 etc., as shown in the embodiment of FIGS. 7 to 11, can be used in combination with the apparatus 154a shown in FIGS. 5 to 6, replacing float lifter 226.

Those skilled in the art will appreciate that the float members could be in the form of ball floats adapted for the various respective embodiments.

In a variation, check valves may be included, either externally or internally, adjacent to the first inlet, the second inlet, and the outlet, respectively, for each valve apparatus. This would act to inhibit or prevent backflow of liquid or beer and thereby further inhibit contamination between kegs. These check valves may be made as part of the apparatus, or alternatively may be connected as separate parts.

In a further variation and referring partly to FIG. 8, a passageway equipped with a check valve may be included within the valve body 282 near the seat 346 and near the outlet 260a. The passageway would extend through the valve body 282 and operatively connect to the outlet 260a. This would allow any residual liquid or beer caught in a pocket defined as that between the bottom 381 and the top 379 of the piston member 377, when the valve member 308 is in the lowered mode of FIG. 8, to pass through the passageway, through the check valve and away from this pocket. Advantageously, this would inhibit any pressure building up in this pocket that might otherwise inhibit the float member 289 from pressing down against the piston aperture 383 and creating a seal. Also, the addition of such a passageway and check valve may make for a cleaner system by further removing residual liquid or beer from the apparatus 254a.

It will further be understood by a person skilled in the art that many of the details provided above are by way of example only and can be varied or deleted without departing from the scope of the invention as set out in the following claims.

What is claimed:

1. A valve apparatus for selectively dispensing beer, the apparatus comprising:
    a valve body having a first inlet for communication with a first source of beer, a second inlet for communication with a second source of beer, an outlet for dispensing the beer, a passageway communicating with the first inlet, the second inlet and the outlet, a valve member disposed within the passageway and inhibiting communication between the first inlet and the second inlet and, in a first position, between the second inlet and the outlet, and a float chamber communicating with the first inlet and the outlet; and
    a float member disposed within the float chamber, the float member being operatively engageable with the valve member, the float member being buoyant and being displaceable upwards to enable communication between the first inlet and the outlet when the first source of beer at least partially fills the float chamber, and when the first source of beer is depleted, the float member lowering to seal the first inlet from the outlet and the valve member moving to a second position thereby to enable the second inlet to be in communication with the outlet for dispensing beer from the second source.

2. The valve apparatus as claimed in claim 1, wherein the float member and the valve member are integral.

3. The valve apparatus as claimed in claim 1, wherein the valve member is interposed between the second inlet and the outlet.

4. The valve apparatus as claimed in claim 1 wherein the first source of beer is pressurized, and when the first source of beer is depleted and the float member lowers to seal the first inlet from the outlet, a pressure differential is created between the float chamber and the outlet which moves the valve member to the second position thereby and enables the second inlet to be in communication with the outlet for dispensing beer from the second source.

5. The valve apparatus as claimed in claim 4, the valve member further including a piston member having a piston aperture, the piston aperture allowing communication between the first inlet and the outlet and being shaped to receive the float member, whereby when the first source of beer is depleted, the piston member receives the float member which thereby seals the first inlet from the outlet, and pressure builds within the float chamber and hence against the piston member, actuating the piston member and thus moving the valve member to the second position thereby.

6. The valve apparatus as claimed in claim 5, the piston member further including a top facing the float chamber, said pressure builds within the float chamber and selectively against the top of the piston member to actuate the piston member and thus move the valve member to the second position thereby.

7. The valve apparatus as claimed in claim 1, the float member further including an end portion that is tapered with a plug extending outwards therefrom for stopping communication between the first inlet and the outlet when the first source of beer is depleted.

8. The valve apparatus as claimed in claim 7 wherein the plug is resilient and wherein the passageway has a first aperture through which the first inlet communicates with the outlet, the plug being shaped to seal the first aperture of the passageway when the first source of beer is depleted.

9. The valve apparatus as claimed in claim 7, wherein the first source of beer is pressurized, the float member includes a piston slidably disposed within the float member near the end portion, a piston rod extending from the piston to at least the end portion, the piston rod being operatively engageable with the valve member, and a resilient member operatively interposed between the piston and the plug for biasing the piston so that the piston rod is disposed in a retracted position near the end portion, whereby when the first source of beer is depleted, the plug seals the first inlet from the outlet, pressure builds within the float chamber thereby and acts against the piston, causing the piston rod to move and displace the valve member to the second position to enable the second inlet to be in communication with the outlet for dispensing beer from the second source.

10. The valve apparatus as claimed in claim 1 wherein the valve member has a first blocking portion which stops communication between the first inlet and the second inlet, a second blocking portion opposite the first blocking portion of the valve member which stops communication between the second inlet and the outlet, and a recess interposed between the first blocking portion and the second blocking portion which enables the second inlet to be in communication with the outlet for dispensing beer from the second source when valve member is moved to the second position.

11. The valve apparatus as claimed in claim 1 further including a latch connectable with the valve member for locking the position of the valve member, the latch being spring-loaded and operatively latching the valve body and the valve member together when the valve member is moved to the second position for locking the position of the valve member thereby.

12. The valve apparatus as claimed in claim 1 wherein the first source of beer is a first keg, the first keg being pressurized, and when the first keg has beer, the first keg at least partially filling the float chamber with beer and causing the float member to displace upwards thereby, and wherein the second source of beer is a second keg, the second keg being pressurized, and the second keg being in communication with the outlet only after the first keg is empty.

13. A system for selectively dispensing beer, the system comprising:
    a first source of beer, a second source of beer, and a third source of beer;
    a first valve apparatus including a valve body having a first inlet in communication with the first source of beer, a second inlet in communication with the second source of beer, an outlet for dispensing beer out of the first valve apparatus, a passageway communicating with the first inlet, the second inlet and the outlet, a valve member disposed within the passageway and inhibiting communication between the first inlet and the second inlet and, in a first position, between the second inlet and the outlet, a float chamber communicating with the first inlet and the outlet, and a float member disposed within the float chamber, the float member being operatively engageable with the valve member, being buoyant and being displaceable upwards to enable communication between the first inlet and the outlet when the first source of beer at least partially fills the float chamber, and when the first source of beer is depleted, the float member falling to seal the first inlet from the outlet and the valve member moving to a second position thereby to enable the second inlet to be in communication with the outlet for dispensing beer out of the first valve apparatus from the second source; and a second valve apparatus including a valve body having a first inlet in communication with the outlet of the first valve apparatus, a second inlet in communication with the third source of beer, an outlet for dispensing beer out of the second valve apparatus, a passageway communicating with the first inlet of the second valve apparatus, the second inlet of the second valve apparatus and the outlet of the second valve apparatus, a valve member disposed within the passageway of the second valve apparatus and inhibiting communication between the first inlet of the second valve apparatus and the second inlet of the second valve apparatus and, in a first position, between the second inlet of the second valve apparatus and the outlet of the second valve apparatus, a float chamber communicating with the first inlet of the second valve apparatus and the outlet of the second valve apparatus, and a float member disposed within the float chamber of the second valve apparatus, the float member of the second valve apparatus being operatively engageable with the valve member of the second valve apparatus, being buoyant and being displaceable upwards to enable communication between the first inlet of the second valve apparatus and the outlet of the second valve apparatus when one from the group consisting of the first source of beer and the second source of beer at least partially fills the float chamber, and when both the first source of beer and the second source of beer are depleted, the float member of the second valve apparatus falling to seal the first inlet of the second valve apparatus from the outlet of the second valve apparatus and the valve member of the second valve apparatus moving to a second position thereby to enable the second inlet of the second valve apparatus to be in communication with the outlet of the second valve apparatus for dispensing beer from the third source.

14. The system as claimed in claim 13 wherein the first source of beer is a first keg, the second source of beer is a second keg and the third source of beer is a third keg.

15. The system as claimed claim 13 wherein the first source of beer, the second source of beer, and the third source of beer are pressurized.

16. The system as claimed in claim 13 further including a pressurized carbon dioxide tank in communication with the first source of beer, the second source of beer, and the third source of beer.

17. The system as claimed in claim 16 further including a pressure regulator manifold interposed between the carbon dioxide tank and the first source of beer, the second source of beer and the third source of beer, respectively, for controlling pressurization of the first source of beer, the second source of beer and the third source of beer.

18. The system as claimed in claim 17 wherein the pressure regulator manifold supplies a target pressure of carbon dioxide to the first source of beer, the second source of beer and the third source of beer.

19. The system as claimed in claim 16 wherein the carbon dioxide tank separately, operatively connects to the first source of beer, the second source of beer and the third source of beer, respectively.

20. The system as claimed in claim 16 further including a beer tap operatively connecting to the outlet of the second valve apparatus for dispensing beer outwards therefrom.

21. A valve apparatus for selectively dispensing liquid, the apparatus comprising:

a valve body having a first inlet for communication with a first source of liquid, a second inlet for communication with a second source of liquid, an outlet for dispensing liquid and a float chamber, the float chamber communicating with the first inlet and the outlet;

a valve member in the valve body operatively interposed between the first inlet and the second inlet for inhibiting communication thereby and, in a first position, being operatively interposed between the second inlet and the outlet for inhibiting communication thereby; and a float member disposed within the float chamber, the float member being operatively engageable with the valve member, being buoyant and being raised within the float chamber when the float chamber is at least partially filed with liquid to allow liquid from the first source to pass from the first inlet and through to the outlet, and when the first source of liquid is depleted, the float chamber having a reduced amount of liquid and the float member lowering to seal the first inlet from the outlet and the valve member moving to a second position thereby to enable the second inlet to be in communication with the outlet for dispensing liquid from the second source.

* * * * *